United States Patent [19]

Wehberg et al.

[11] Patent Number: 5,457,366
[45] Date of Patent: Oct. 10, 1995

[54] ELECTRONIC CONTROL DEVICE FOR AN ELECTRONICALLY COMMUTATIVE MOTOR

[75] Inventors: Josef Wehberg, Buehl; Michael Soellner, Rheinmuenster; Joerg Albrecht, Karlsruhe, all of Germany

[73] Assignee: Robert Bosch GmbH, Stuttgart, Germany

[21] Appl. No.: 219,890

[22] Filed: Mar. 30, 1994

[30] Foreign Application Priority Data

Mar. 30, 1993 [DE] Germany .................. 43 10 260

[51] Int. Cl.$^6$ .................................................. H02P 7/00
[52] U.S. Cl. ............................................ 318/439; 318/254
[58] Field of Search ........................... 318/439, 254, 318/138

[56] References Cited

U.S. PATENT DOCUMENTS

| | | | |
|---|---|---|---|
| 4,494,051 | 1/1985 | Bailey | 318/254 |
| 4,500,830 | 2/1985 | Gotou et al. | 318/254 |
| 4,520,296 | 5/1985 | Lepper et al. | 318/254 |
| 4,527,102 | 7/1985 | Gotou | 318/254 |
| 4,528,486 | 7/1985 | Flaig et al. | 318/254 |
| 4,638,223 | 1/1987 | Tajima et al. | 318/439 X |
| 4,644,234 | 2/1987 | Nola | 318/254 |
| 4,677,356 | 6/1987 | Tsuneda et al. | 318/254 X |
| 4,763,052 | 8/1988 | Lindin et al. | 318/254 |
| 4,833,374 | 5/1989 | Watanabe et al. | 318/254 |
| 5,012,166 | 4/1991 | Ushijima et al. | 318/439 X |
| 5,134,682 | 7/1992 | Müller | 388/915 |

FOREIGN PATENT DOCUMENTS

| | | |
|---|---|---|
| 0467085A1 | 1/1992 | European Pat. Off. . |
| 0217599B1 | 2/1992 | European Pat. Off. . |
| 2834523 | 2/1980 | Germany . |
| 3012833 | 10/1981 | Germany . |
| 3537403 | 4/1987 | Germany . |
| 9013125 U | 2/1992 | Germany . |
| 4040926 | 4/1992 | Germany . |

*Primary Examiner*—Jonathan Wysocki
*Attorney, Agent, or Firm*—Spencer, Frank & Schneider

[57] ABSTRACT

An electronic control device for an electric motor (10), particularly an electrically commutated (EC) motor, whose motor windings (11 to 13), in order to control the winding current, are connected in series with respective control transistors (15 to 17) whose control connections are charged by control pulses which are triggered by commutation signals and which have a predeterminable pulse-duty factor (block control). At the same time, the control device varies the amplitudes of the control pulses to control and permit the operation of the control transistors (15 to 17) in their amplifying range (linear control). Block control dominates in the upper rpm range in order to improve efficiency with respect to pure linear control, and linear control dominates in the lower rpm range in order to prevent severe current peaks, and hence an increased noise development that would occur with pure block control.

15 Claims, 3 Drawing Sheets

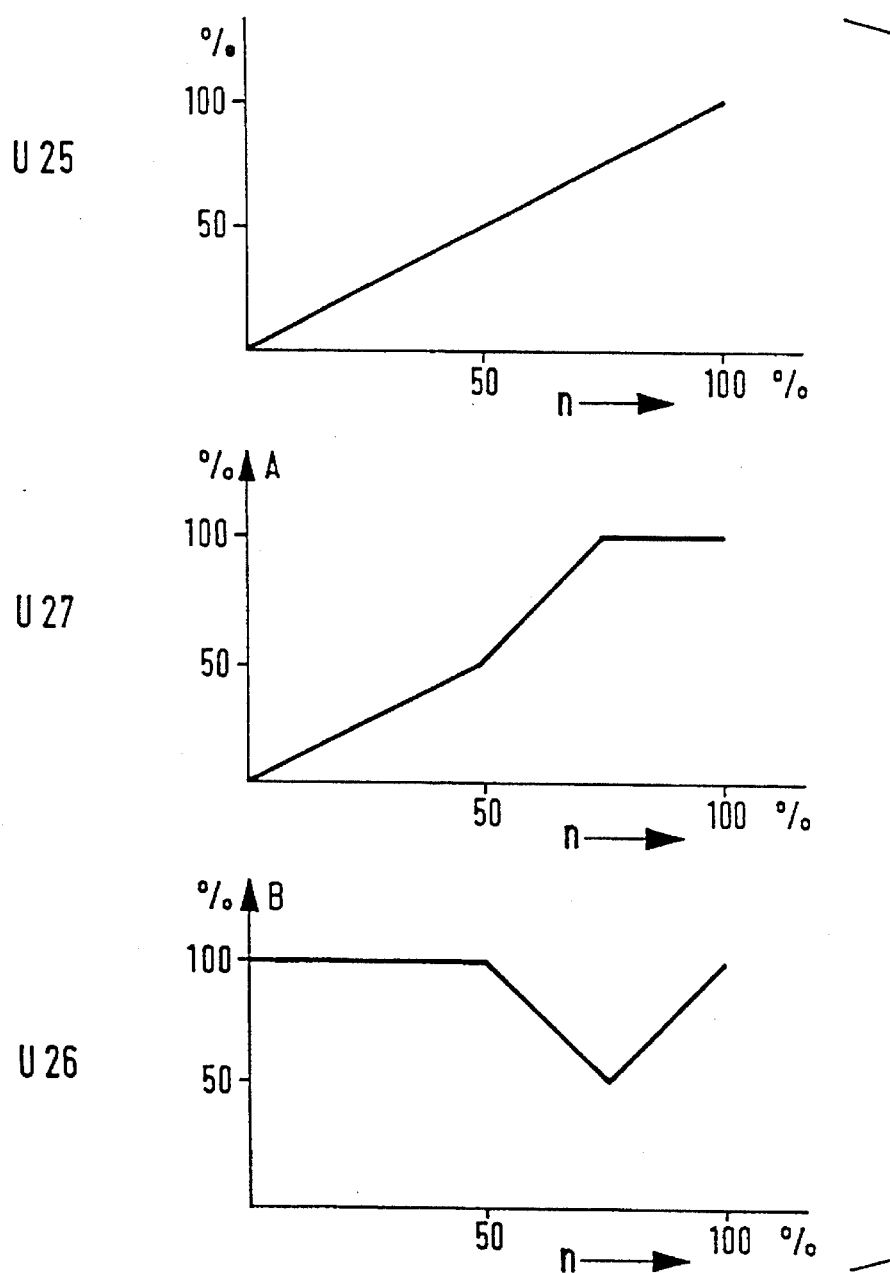

ELECTRONIC CONTROL DEVICE FOR AN ELECTRONICALLY COMMUTATIVE MOTOR

REFERENCE TO RELATED APPLICATIONS

This application claims the priority of German patent application Ser. No. P 43 10 260.3 filed Mar. 30, 1993, which is incorporated herein by reference.

BACKGROUND OF THE INVENTION

The invention relates to an electronic control device for an electric motor, e.g., an electronically commutated motor, whose motor windings are connected in series with respective control transistors to control the winding currents, and with the control connections of the transistors being charged by control pulses triggered by commutation signals and having a predeterminable pulse-duty factor.

Various alternatives are available for controlling electric motors. For example, an electronically commutated motor (EC motor) is known that has a high-frequency cadence. This type actuation, however, is not applicable to low-power motors, such as servomotors in motor vehicles, because of the considerable circuit complexity and problems with radio interference which are very difficult to overcome.

Moreover, an EC motor is known that has linear actuation. In this case, the rpm is set by operating the power transistors connected in the circuits of the motor windings in their amplifying range. The transistor-resistance additionally functioning in the armature circuit causes the characteristic curve of the motor to dip around the idle point. This process essentially corresponds to a series resistor control. The output power in this case is proportional to the third power of the rpm, whereas the received power is proportional to the square of the rpm. Consequently, at ⅔ of the nominal output, the stray power is the highest, and efficiency at this rpm is 66% of the maximum possible efficiency. Linear control thus inevitably leads to a reduced efficiency proportional to the rpm in the partial control range. In addition to the low efficiency, a high temperature stress of the power electronics occurs during partial load operation, because the lost power is converted into heat.

Finally, block control is also known. In this instance, the rpm is set by means of the change in the actually used angle of current flow with respect to the commutation angle. The control transistors are controlled so that they are either completely switched through (conducting) or completely switched off (non-conducting); however, the turn-on or energization time of the control transistors is varied. In this case the angle of current flow can have a fixed reference at the initiation of the commutation time. However, the deenergization point (end of the commutation angle) can be maintained while the energization time is varied. Moreover, it is possible to vary both the energization and deenergization times symmetrically to the mid-point of the commutation angle. In each case the transistors are operated in the switching mode, that is, with minimum volume resistance in MOSFETs, or with minimum collector-emitter voltage in bipolar transistors. The mode of operation is similar to a pulse-width-modulated low set point regulator. It is disadvantageous that at low motor rpm and subsequently at low induced voltage, the current can attain very high amplitude values during the current flow time. The connection or relationship can nearly be recognized from the following equation:

$$L\frac{di}{dt} + R \times i = U_b - u_i$$

The current-driving voltage (the difference of the battery or supply voltage $U_B$ and the induced voltage $u_i$ of the motor) is applied to a series connection of the winding inductance L and the winding resistor R. Consequently, the current amplitude, which is limited by resistor R, and results from the induced voltage, and thus the rpm, is $$\hat{i} = \frac{U_B - u_i}{R}$$

Only the changes in current di/dt are inhibited by the inductance L of the motor.

As a result, when the motor is rotating slowly ($u_i$ is small, f has a low frequency), very high peak loads occur that in turn cause the development of intense noise by means of instantaneous pulsation in direct association with the torque. Moreover, a strongly pulsing current draw has a negative effect on the overall supply mains, for example, in a vehicle.

It is therefore an object of the present invention to provide an improved control device which avoids disadvantages of the above mentioned type control devices.

SUMMARY AND ADVANTAGES OF THE INVENTION

The above object generally is achieved according to the present invention by an electronic control device for an electric motor, particularly an electronically commutated motor having motor windings connected in series with respective control transistors to control the winding current in the respective motor windings, and a control circuit means, responsive to currents flowing through the control transistors and to an input value corresponding to a desired value of a controlled parameter of the motor and having respective outputs connected to respective control connections of the control transistors, for supplying respective output control pulses, which are triggered by commutation signals and have a predeterminable energization period or pulse-duty factor (block control) and which simultaneously have a variable amplitude for operating the control transistors in their amplifying range (linear control), to the respective control connections of the transistors.

In contrast to the prior art, the advantage of the control device according to the invention is that the advantages of block control are combined with those of linear control, while at the same time the disadvantages are eliminated. Block control dominates in the upper rpm range, for example, between half of the maximum rpm for the motor and the maximum rpm, and prevents the low efficiency and temperature stress typical for linear control in this upper rpm range. Therefore, in the upper rpm range the efficiency is increased by up to 20% with the partial control. When the rpm is reduced, linear control is gently initiated, and permits the rpm to be brought back to a value of zero without the significant current flow increase and hence noise development that are typical for block control in the lower rpm range. Thus, good controllability is assured with an overall high efficiency, even in the very low rpm range, and a smooth current course or path without peak loads is attained.

Advantageous features and improvements of the control device according to the basic invention likewise are disclosed.

According to the preferred embodiment of the invention, the predeterminable pulse-duty factor or energization period is preferably defined essentially at 50 to 100% of the maximum motor rpm to reliably avoid the increased noise development in the lower rpm range. When a pulse-duty factor of 50% is attained, the amplitude of the control signal voltage to the control transistors is lowered to further reduce the rpm, that is, linear control is activated.

An advantageous feature lies in that a regulating device is provided for the rpm and/or the motor current, and the controller output voltage for predetermining the block length (respective energization or output flow time) and amplitude of the control signals (pulses) is supplied to a functional device disposed upstream of the control transistors. Moreover, the commutation signals are employed in an advantageous manner in the formation of actual rpm values for the rpm regulation device.

In an advantageous manner, the functional device includes a function generator for the lengths of the control signals (pulses) as a function of the rpm, and a function generator for the control signal amplitudes as a function of the rpm. Of course, a single function generator may include both functions.

In a further advantageous manner, a switching circuit for temporarily triggering control signals as a function of the commutation signals is disposed downstream of this function generator. The electronic control device is particularly suited for an electrically commutated d.c. motor (EC motor) that preferably has three motor windings connected in a star connection, each being connected to a respective control transistor. However, the control device can also be used in a modification for motors having a different number of windings.

BRIEF DESCRIPTION OF THE DRAWINGS

An embodiment of the invention is shown in the drawings and described in detail below in the detailed description.

FIG. 3 contains signal diagrams for explaining the formation of the control signals of FIG. 2 by means of predetermined functions.

DETAILED DESCRIPTION OF THE PREFERRED EMBODIMENT

Figure 1:
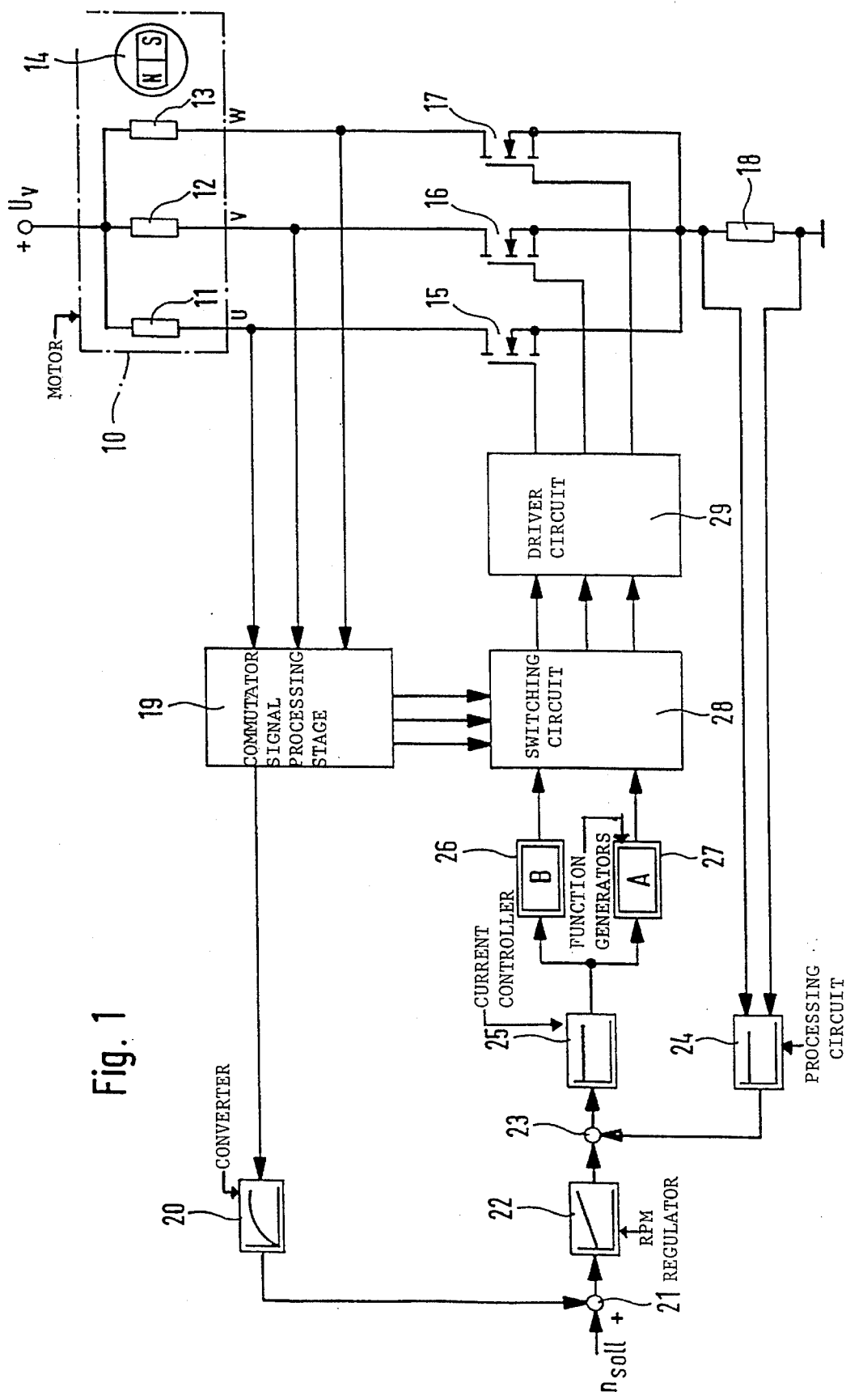
FIG. 1 is a circuit diagram of an electronic control device for an EC motor according to a preferred embodiment of the invention.

In the example shown in FIG. 1, an electronically commutated motor, referred to hereinafter as EC motor 10, is intended to be set or regulated to the appropriate rpm as a function of a predeterminable nominal rpm value $n_{soll}$. The EC motor 10 includes three motor windings 11, 12 and 13, which are connected in a star connection, and a permanently-magnetized rotor 14. In principle, however, the circuit shown and described below could also be used in other d.c. motors.

The common connecting point of the three motor windings 11, 12 and 13 is connected to the positive terminal of a supply voltage source $U_v$. For controlling the winding currents, the respective connections of motor windings 11 to 13 opposite the common connection are connected to three field-effect transistors (FET) 15, 16 and 17, respectively, whose respective channels connect motor windings 11, 12 and 13 to one end of a shunt resistor 18 whose other end is grounded.

Furthermore, the three motor windings 11 to 13 each are connected to a commutation signal-processing stage 19, in which the induced voltages of motor windings 11 to 13 are further processed into commutation signals in a conventional manner. Moreover, the signal-processing stage 19, likewise in a known manner, generates a signal corresponding to the actual rpm. This actual rpm signal is supplied to a converter or transforming stage 20, where the signal is converted into a d.c. signal proportional to the rpm.

The d.c. signal proportional to the actual rpm value appearing at the output of converter stage 20 is compared with a desired rpm value $n_{soll}$ in a comparator 21, and the deviation or difference is supplied to an rpm regulator 22. At its output this regulator 22 emits a nominal or desired current value that is compared with an actual rpm value in a comparator 23. To create this actual rpm value, the voltage drop across resistor 18, which voltage drop is proportional to the winding current, is supplied to a processing circuit 24 for adapting this actual rpm value to the requirements of comparator 23. The deviation resulting from the comparison in comparator 23 is supplied to a current controller 25.

The controller output voltage of the current controller 25 is supplied in parallel to two function generators 26 and 27. Independently of its initial voltage, function generator 26 determines the current flow time, that is, the block length, of the control signals for transistors 15 to 17, or in other words the respective current flow time in motor windings 11 to 13. This block length is determined essentially between 50% and 100% of the maximum current flow time, that is, the control signal series for transistors 15 to 17 have a pulse-duty factor between 0.5 and 1.

The second function generator 27 defines the amplitude of these control signals during the current flow time as a function of the output signal of current controller 25.

The output signals of function generators 26 and 27 are supplied to a switching circuit 28, where the block length signals and amplitude signals are linked with the three commutation signals produced by processing stage 19 and supplied as controls signals to a downstream driver circuit 29. This driver circuit 29, with its three outputs, then controls the three transistors 15 to 17.

In FIG. 3, U25 represents a current-controlled signal that is proportional to the rpm and is present at the output of current controller 25. From this signal U25, an amplitude function U27 is formed in accordance with the center diagram of FIG. 3 in function generator 27 as a function of the rpm. Correspondingly, the block length function U26 shown in the bottom diagram of FIG. 3 is formed in function generator 26 as a function of the rpm. Of course, these function diagrams merely represent examples, and in principle any number of desired functions can be realized.

Figure 2:
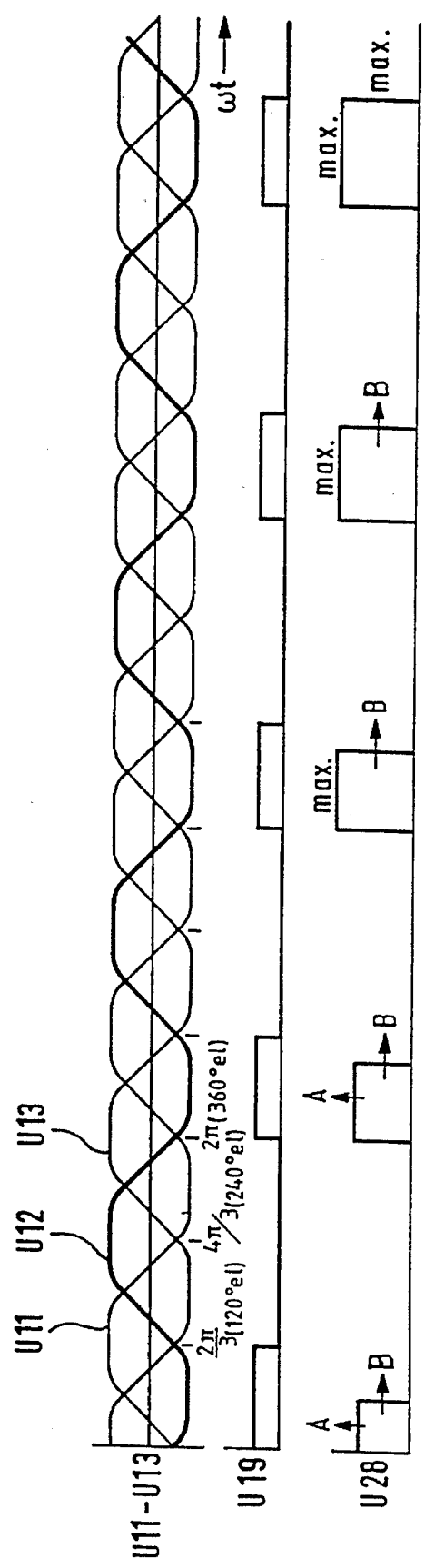
FIG. 2 is a signal diagram for explaining the commutation and formation of control signals for the control transistors of FIG. 1.

FIG. 2 shows the voltages U11 to U13, which are induced in motor windings 11 to 13, respectively. The commutation signals U19 formed from these induced voltages in processing stage 19 are represented below the voltages U11 to U13. For the sake of simplicity, only those commutation signals U19 that correspond to the induced voltage U12 of motor winding 12, shown in thick lines, are shown. The commutation signals (not shown) corresponding to the other induced voltages U11 and U13 are respectively staggered at 120°. A control signal, whose block length B and amplitude A are determined in accordance with FIG. 3, is formed from the output signals of function generators 26 and 27 in the switching stage or circuit 28. This control signal is triggered by commutation signals U19, forming output signals U28 at the output of switching circuit 28. Also for the sake of simplicity, the only control signal shown here is for the center transistor 16, which controls motor winding 12. Signals U28 for the other transistors 15 and 17 are also staggered at 120°.

According to the preferred illustrated embodiment of the invention and as can be seen from FIG. 3, at low rpm and during startup, first the linear drive is active, and rpm control is effected via current amplitude U27. The block control is maintained at 100% of block length U26. Once half of the maximum rpm of the motor has been attained, the amplitude control U27 increases superproportionally with respect to the rpm increase U25, while at the same time block length U26 is continuously reduced to 50%, resulting in an unchanging, uniform rpm increase for the motor. The maximum amplitude (U27) is attained in the rpm range of 75% of the maximum rpm (can be adapted to the requirements by means of function generators 26 and 27), and the subsequent rpm increase occurs exclusively over the block length (U26).

In a simpler version, the current controller 25 superposed on the rpm control can be omitted, and in the simplest version the block length control can be effected directly with the rpm signal.

The invention now being fully described, it will be apparent to one of ordinary skill in the art that any changes and modifications can be made thereto without departing from the spirit or scope of the invention as set forth herein.

We claim:

1. An electronic control device for an electric motor having motor windings connected to respective terminals, with the control device comprising:

a respective control transistor for controlling the winding current in a respective motor winding connectable in series with a respective terminal;

a control circuit means, responsive to currents flowing through said transistors and to an input value corresponding to a desired value of a controlled parameter of the motor and having respective outputs connected to respective control connections of said control transistors, for supplying respective output control signals, which are triggered by commutation signals and have a predeterminable pulse-duty factor (block control) and which simultaneously have a variable amplitude for operating said control transistors in their amplifying range (linear control), to said respective control connections of said control transistors to control the energization of the respective transistors, said control circuit means including at least one control device for the controlled parameter, with said at least one control device being responsive to at least the desired input value and producing an output control voltage which is supplied to a function generating device which is disposed upstream of said control connections of said transistors and presets the length and amplitude of said output control signals, and a switching circuit disposed downstream of said function generating device for timely triggering of said control pulses as a function of the commutation signals; and said function generating device includes a first function generator for controlling the lengths of said control signals as a function of the rpm, and a second function generator for controlling the amplitudes of said control signals as a function of the rpm of the motor.

2. A control device as defined in claim 1, wherein said control circuit means essentially limits the degree of control of the block control to 50 to 100% of a corresponding maximum rpm value for the motor.

3. A control device as defined in claim 1, wherein: the controlled parameter is at least one of the motor rpm and the motor current; and said control circuit means includes at least one control device for at least one of the rpm and the motor current.

4. A control device as defined in claim 3, wherein said at least one control device is an rpm control device, and said control circuit means further includes means for forming the actual rpm signals from commutation signals determined from the induced voltage, and for supplying corresponding signals to said rpm control device.

5. A control device as defined in claim 4, wherein: said at least one control device further includes a motor current control device connected downstream of said rpm control device; and said control circuit means further includes means for measuring current flow through said control transistors and for supplying a corresponding signal to said motor current control device.

6. A control device as defined in claim 1, wherein the electric motor is an electronically commutated d.c. motor (EC motor).

7. A control device as defined in claim 6, wherein the electric motor has three of said motor windings which are connected in a star circuit to three of said control transistors.

8. A control device as defined in claim 1, wherein said control transistors are FET transistors.

9. In combination with an electronically commutated electric motor having a plurality of motor windings, a given maximum rpm value and an upper rpm range extending to said maximum rpm value, i a control device comprising:

a respective control transistor having its controlled current path connected in series with a respective motor winding for controlling the winding current in a respective motor winding; first circuit means for producing respective commutation signals in response to winding currents in said motor windings; regulating circuit means, responsive to an input signal corresponding to a desired rpm value for the motor and a signal corresponding to an actual rpm value for the motor, for producing a regulating signal corresponding to the deviation between the desired and actual rpm values; control circuit means, responsive to said commutation signals and to at least one input signal, for supplying respective output control pulses, which are triggered by the commutation signals and have a predeterminable pulse-duty factor (block control) and which simultaneously have a controllable variable amplitude selectively for operating said control transistors in their amplifying range (linear control), to respective control connections of said control transistors; and function generating means, which are responsive to said regulating signal, for producing at least one function which constitutes said at least one input signal to said control circuit means and which causes said control circuit means to produce said output control pulses to control the winding currents by variation of the pulse-duty factor in the upper rpm range and by variation of the pulse amplitude in a further lower rpm range.

10. The apparatus defined in claim 9, wherein said upper rpm range is from approximately 50 to 100% of the maximum rpm value of the motor.

11. The apparatus defined in claim 10, wherein said motor is an electronically commutated d.c. motor having three of said motor windings which are connected in a star circuit to three of said control transistors.

12. The apparatus defined in claim 11, wherein said control transistors are FET transistors.

13. An electronic control apparatus for an electronically commutated electric motor having a plurality of motor windings, said control device comprising:

a respective control transistor having its controlled current path connected in series with a respective motor winding for controlling the winding current in a respective motor winding; first circuit means for producing respective commutation signals in response to winding currents in said motor windings; regulating circuit means, responsive to an input signal corresponding to a desired rpm value for the motor and a signal corresponding to an actual rpm value for the motor, for producing a regulating signal corresponding to the deviation between the desired and actual rpm values; control circuit means, responsive to said commutation signals and to at least one input signal, for supplying respective output control signals, which are triggered by the commutation signals and have a predeterminable pulse-duty factor (block control) and which simultaneously have a controllable variable amplitude for selectively operating said control transistors in their amplifying range (linear control), to respective control connections of said control transistors; and function generating means, which are responsive to said regulating signal, for producing at least one function, which constitutes said at least one input signal to said control circuit means, for causing said control circuit means to produce said output control signals to control the winding currents such that, with increasing motor rpm, (a) the amplitude of the control signals initially increases up to a first rpm value in a lower rpm range at a pulse-duty factor of 100%, (b) at the first rpm value, the amplitude of the control signals further increases up to a predetermined second rpm value in a middle rpm range to a maximum amplitude value while the pulse-duty factor of the control signals reduces from 100% to a smaller value, and (c) after the second rpm value the pulse-duty cycle increases up to 100% in an upper rpm range to a maximum rpm value for the motor at said maximum amplitude of the control signals.

14. An electronic control apparatus as defined in claim 13 wherein the first rpm value is substantially 50% of the maximum rpm value for the motor.

15. An electronic control apparatus as defined in claim 14 wherein the second rpm value is substantially 75% of the maximum rpm value for the motor.

* * * * *